(12) United States Patent
Kathan et al.

(10) Patent No.: US 9,435,693 B2
(45) Date of Patent: Sep. 6, 2016

(54) TEMPERATURE SENSOR FOR HYGIENIC APPLICATIONS WITH CLAMPABLE PROCESS CONNECTOR

(71) Applicant: IFM ELECTRONIC GMBH, Essen (DE)

(72) Inventors: Benno Kathan, Kressbronn (DE); Stefan Kreis, Tettnang (DE)

(73) Assignee: IFM ELECTRONIC GMBH (DE)

( * ) Notice: Subject to any disclaimer, the term of this patent is extended or adjusted under 35 U.S.C. 154(b) by 419 days.

(21) Appl. No.: 14/038,795

(22) Filed: Sep. 27, 2013

(65) Prior Publication Data

US 2014/0146848 A1 May 29, 2014

(30) Foreign Application Priority Data

Sep. 27, 2012 (DE) .................. 10 2012 217 680
Oct. 11, 2012 (DE) .................. 10 2012 218 563

(51) Int. Cl.
*G01K 1/14* (2006.01)
*G01K 1/08* (2006.01)
*G01K 13/02* (2006.01)

(52) U.S. Cl.
CPC . *G01K 1/14* (2013.01); *G01K 1/08* (2013.01); *G01K 13/02* (2013.01)

(58) Field of Classification Search
CPC .......... G01K 1/08; G01K 1/14; G01K 13/02; G01K 2013/026
USPC ............................................. 374/100; 72/347
See application file for complete search history.

(56) References Cited

U.S. PATENT DOCUMENTS

| 4,496,178 | A | * | 1/1985 | Best | E05B 55/12 292/1.5 |
|---|---|---|---|---|---|
| RE32,881 | E | * | 2/1989 | Muellenberg | F16D 1/094 403/16 |
| 5,462,359 | A | * | 10/1995 | Reichl | G01K 13/02 338/22 R |
| 5,609,369 | A | * | 3/1997 | Wilder | F16L 23/003 24/279 |
| 2005/0185696 | A1 | * | 8/2005 | Nakabayashi | G01K 13/02 374/145 |
| 2006/0082154 | A1 | * | 4/2006 | Hartig | F01N 13/1805 285/408 |
| 2006/0201265 | A1 | * | 9/2006 | Klees | G01K 1/08 73/866.1 |
| 2007/0058690 | A1 | * | 3/2007 | Feldmeier | G01K 13/02 374/147 |
| 2007/0186659 | A1 | * | 8/2007 | Engelhardt | G01D 11/245 73/708 |
| 2007/0232147 | A1 | * | 10/2007 | Herberg | F16L 13/142 439/638 |
| 2008/0236272 | A1 | * | 10/2008 | Thierbach | F16K 31/0675 73/168 |
| 2008/0302171 | A1 | * | 12/2008 | Isomura | G01K 1/10 73/23.31 |
| 2011/0032971 | A1 | * | 2/2011 | Reiter | G01K 1/12 374/208 |
| 2011/0150034 | A1 | * | 6/2011 | Breimon | G01K 1/08 374/148 |

* cited by examiner

*Primary Examiner* — Lisa Caputo
*Assistant Examiner* — Philip Cotey
(74) *Attorney, Agent, or Firm* — Schmeiser, Olsen & Watts, LLP

(57) ABSTRACT

A conical flange of a temperature sensor for hygienic applications as a deep drawn part with a disk-shaped lower part 30c and an upper part, wherein the upper part partially serves as clamping surface is provided.

7 Claims, 4 Drawing Sheets

TEMPERATURE SENSOR FOR HYGIENIC APPLICATIONS WITH CLAMPABLE PROCESS CONNECTOR

CROSS-REFERENCE TO RELATED APPLICATIONS

Figure 1:
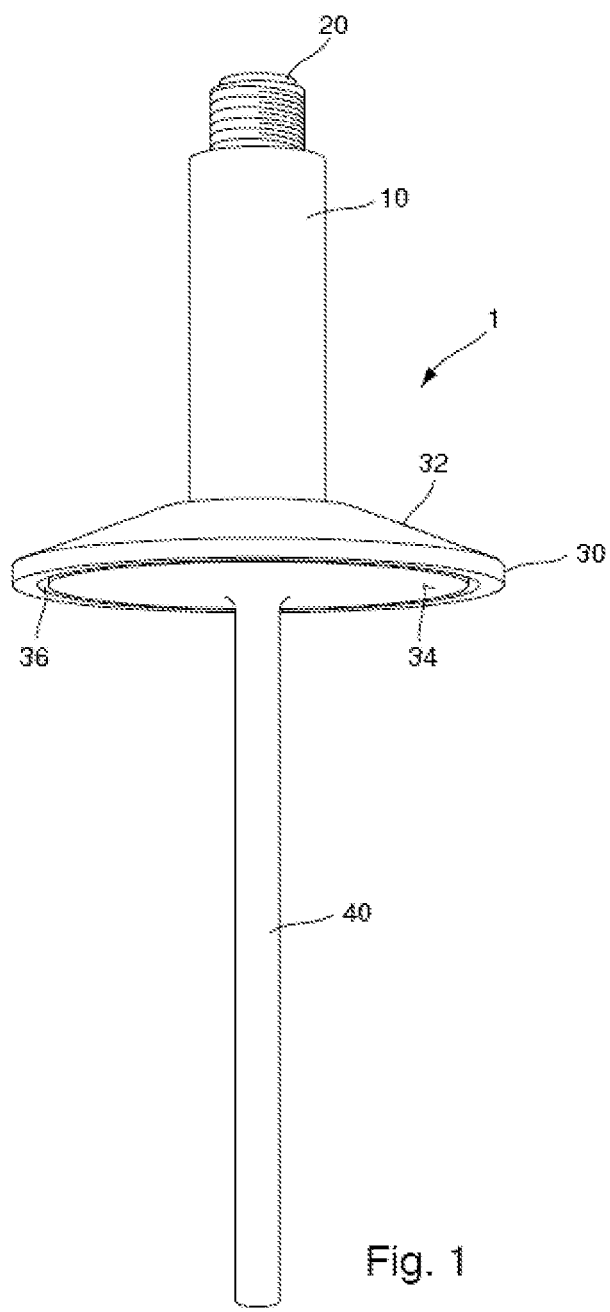

This application claims priority to German Application No. 10 2012 218 563.1 filed on Oct. 11, 2012 and German Application No. 10 2012 217 680.2 filed on Sep. 27, 2012, pursuant to U.S.C. §119.

FIELD OF TECHNOLOGY

The following relates to a temperature sensor for hygienic applications with a clampable process connector.

BACKGROUND

Temperature sensors are used in many areas of process automation engineering in order to measure temperatures of media, preferably in containers or pipelines. In certain industrial areas, for example in the foodstuffs industry or in the pharmaceutical industry, particularly special requirements are in place with respect to hygiene. Therefore, all parts in contact with the medium must be properly cleaned. For example, the standardized cleaning method, CIP, in which all surfaces in contact with the media are cleaned according to standardized methods without disassembly of a process system In particular the connecting parts of process connector—container tubes are very critical with respect to the cleaning requirements.

Temperature sensors for hygienic applications feature different process connectors. Known process connectors are the milk tube screw connection per DIN 11851 or a clamp connection per ISO 2852 or DIN 32676. Conventional temperature sensors with a clampable process connector, such as the TM4901 which is produced and sold by the firm of ifm electronic gmbh, as a rule feature a conical flange which is clamped to a corresponding opposing connector. A clamp surface at the upper side of the conical flange is required for the clamp connection and the bracket which is produced with the clamp connection engages thereon. The opposing connection is normally welded in the container wall or tube wall as a short pipe. The tube-shaped temperature probe extends through this short pipe into the corresponding medium.

In addition to the temperature tube probe and the conical flange, a typical temperature sensor also features a housing with evaluation electronics and plug connector or cable lead. The conical flange and the actual sensor housing are generally welded to each other.

Since the conical flange in such temperature sensors for hygienic applications is manufactured from solid material, temperature sensors are accordingly expensive, complicated to manufacture and also heavy. As a rule the conical flange must be produced by external companies which requires expensive logistics for sensor manufacture.

SUMMARY

A first aspect relates to creating a temperature sensor for hygienic applications which is simple and low in cost to manufacture.

A second aspect relates to designing the conical flange of a temperature sensor for hygienic applications as a deep drawn part with a disk-shaped lower part and an upper part, wherein the upper part partially serves as clamping surface.

In accordance with a first embodiment, flaps on the disk-shaped lower part act as the upper part. The flaps are bent upward and partly backward so that they will act as clamping surfaces. The forces caused by the brackets due to the clamp connection are optimally applied via the flaps.

According to a second embodiment, an extension on the housing acts as upper part.

BRIEF DESCRIPTION

FIG. 1 Conventional temperature sensor for hygienic applications with conical flange as process connector, shown in perspective view.

Figure 2:
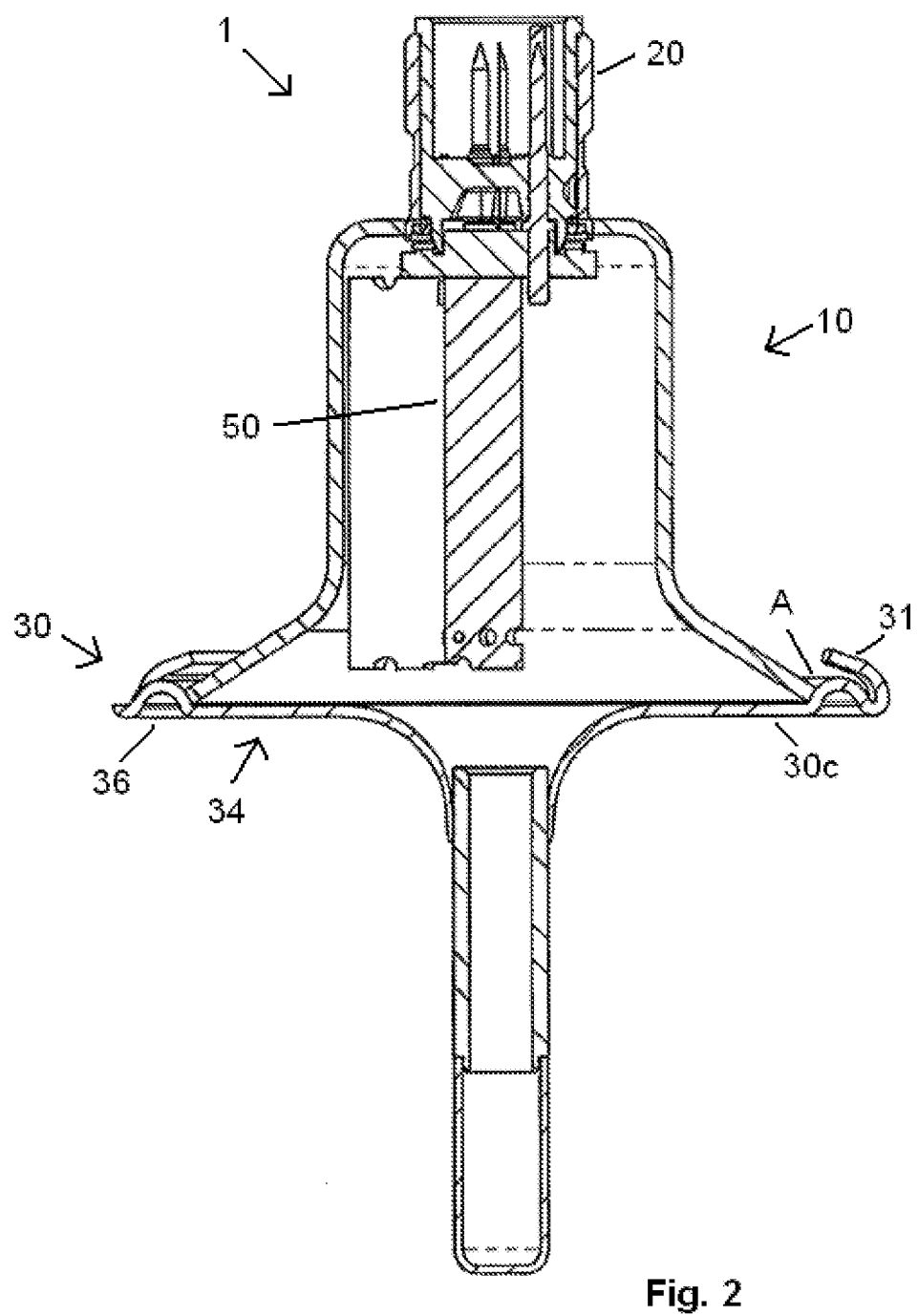

FIG. 2 Temperature sensor for hygienic showing a first embodiment in cross sectional representation.

Figure 2A:
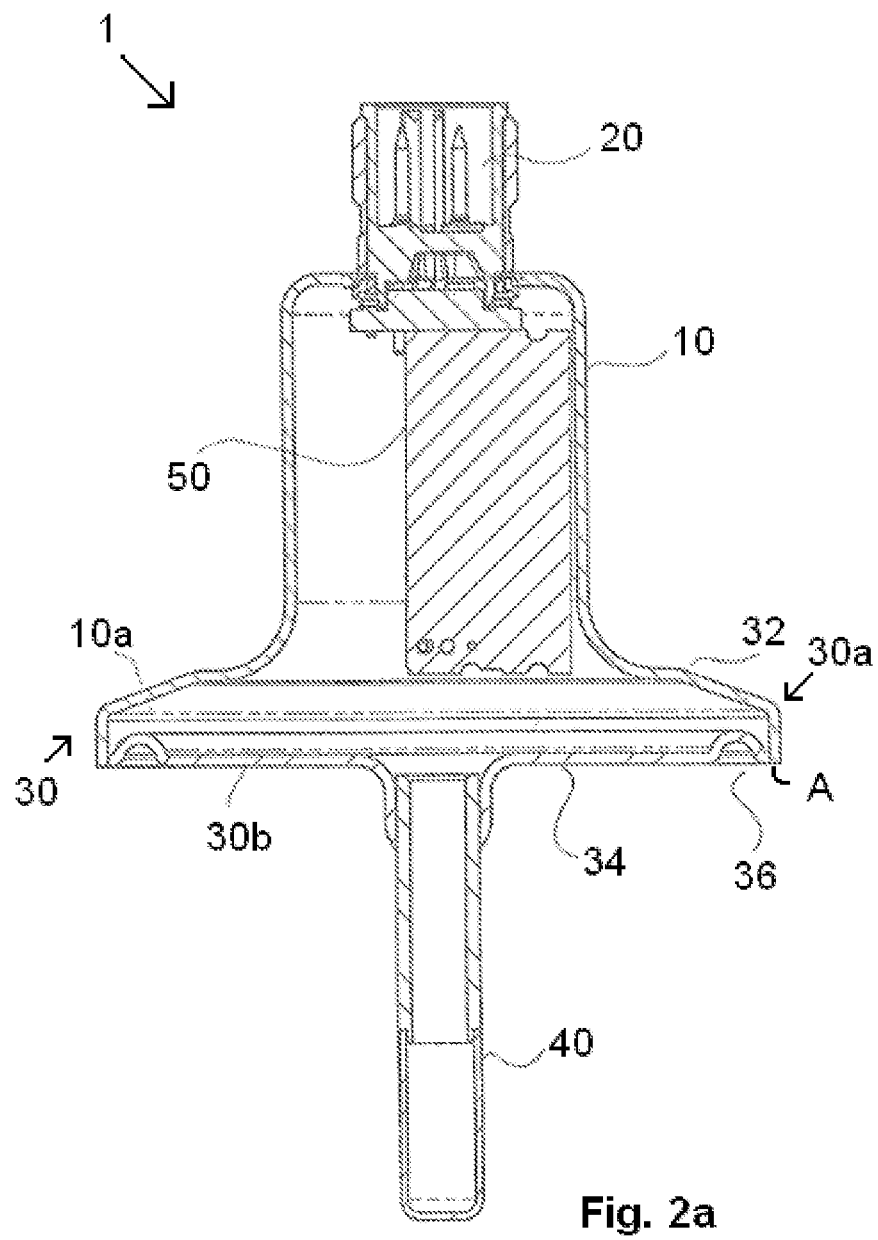

FIG. 2a Temperature sensor for hygienic applications showing a second embodiment in cross sectional representation.

Figure 3:
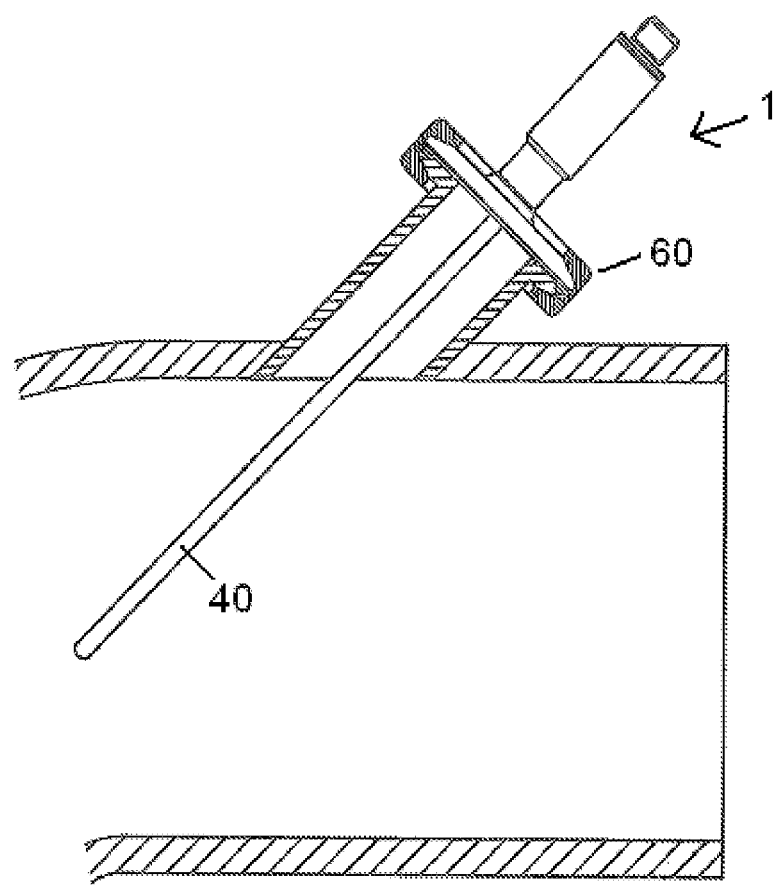

FIG. 3 Temperature sensor for hygienic applications with a clamp connection having a fitted connector pipe shown in cross sectional representation.

DETAILED DESCRIPTION

FIG. 1 presents a conventional temperature sensor for hygienic applications 1. The temperature sensor 1 consists essentially of a housing 10 having on one end a plug connector 20 and on the opposite end a conical flange 30, from which a rod-shaped temperature probe 40 protrudes. The sensor 1 is supplied with voltage via the plug connector 20. The sensor also serves to output a measurement or switching signal which is sent to an external evaluation/control unit.

The housing 10 and the conical flange 30 are welded together.

The top side of the conical flange 30 acts as clamping surface 32. On the bottom side the conical flange 30 features a sealing surface 34 with integrated groove 36. The groove 36 acts to accept and position a shaped gasket, e.g. of EPDM.

The conical flange 30 is a rotary part produced from stainless steel. Due to the cost of the material and the complicated manufacture thereof, the conical flange and thus the temperature sensor are expensive.

In the interior of the housing 10 there is an electronic circuit board containing various electronic components which serve, among other purposes, to process the measurement signal supplied, for example, from a PT 100 element.

FIG. 2 shows the inventive temperature sensor for hygienic applications according to a first variant. In contrast to the temperature sensor illustrated in FIG. 1, the conical flange here is designed as a deep drawn part which consists of a disk-shaped lower part 30c and an upper part. On the deep drawn part 30c (lower part) there are flaps 31 provided on the wheel-side which are bent upward and back during the manufacturing process. The bent flaps 31 form the upper part of the conical flange. At certain angular settings of the clamping surface 32 they correspond to a conventional conical flange 30.

The sealing surface 34 is located on the underside of the disk-shaped deep drawn part 30c. The deep drawn part 30c and the housing 10 are welded together along a connecting line A.

FIG. 2a shows the inventive temperature sensor for hygienic applications according to a second variant of the invention. In contrast to the temperature sensor illustrated in FIG. 2, the former features a two-part conical flange. The upper part 30a of the conical flange with clamping surface 32 is formed by an extension 10a provided on the housing 10. The lower part of the conical flange with sealing surface 34 is formed by a separate, disk-shaped deep drawn part 30b, which corresponds to the deep drawn part 30c—except for the flaps. The two parts are welded together along a connecting line A.

FIG. 3 shows a conventional temperature sensor for hygienic applications with a clamp connection with a connecting pipe provided on one container wall. A bracket 60 is needed for the clamp connection and said bracket engages around the clamp surface 32 on the temperature sensor 1 and an extension provided on the connection pipe. Due to the invention, the manufacture of a temperature sensor can be greatly simplified. In a first process step, a disk-shaped sheet metal part is reformed in a punching, bending and deep drawing process step to form the lower part 30b or 30c.

Next, the housing 10 is welded on.

To design the clamping surface 32 as flaps 31 located on the lower part is advantageous in particular for larger flange diameters, e.g. 2" (inches) and greater. In the case of larger flange diameters the material savings in rotary parts is evident.

In the second variant of the invention, the extension 10a acting as clamping surface 32 is formed on the housing 10 during the deep drawing process of the housing. To design the clamping surface 32 as a part of the housing 10 is only advantageous for small flange diameters of 1" to 1½".

For larger flange diameters greater than 2" in the second variant the material consumption would be accordingly great and the deep drawing process relatively expensive.

The temperature sensors according to the invention can be used like conventional temperature sensors for hygienic applications with a clampable process connector as per the Standards ISO 2852 or DIN32676.

The housing 10 and the conical flange 30b are produced from stainless steel for hygienic applications.

Because the conical flange is no longer produced as a rotary part from the solid material, a considerable material savings will result, which then leads to a cost reduction and weight reduction. The conical flange can be produced more easily and more quickly as a deep drawn part than as a rotary part.

A complicated bearing unit, like that often required for rotary conical flanges, can likewise be omitted.

The subject matter of the invention is also the simple manufacturing process.

The invention is suitable not only for temperature sensors, but rather also for other sensors for hygienic applications with clampable and/or screw-down process connector.

The invention claimed is:

1. A temperature sensor for hygienic applications with a clampable process connector with a housing including a plug connector and a conical flange which acts as a process connector and as a mount for a temperature tube probe wherein the conical flange is designed as a deep drawn part;
   wherein the conical flange is a two-part conical flange including a disk-shaped lower part and a disk-shaped upper part that is a separate part from the disk-shaped lower part;
   wherein a clamping surface is located on the disk-shaped upper part, and a sealing surface with a groove for a shaped gasket is provided on the disk-shaped lower part of the two-part conical flange.

2. The temperature sensor according to claim 1, wherein the disk-shaped lower part includes a plurality of shaped flaps which form the upper part.

3. The temperature sensor according to claim 1, wherein provided on the housing there is an extension which forms the disk-shaped upper part of the conical flange.

4. The temperature sensor according to claim 1, wherein the housing is designed as a deep drawn part.

5. The temperature sensor according to claim 1, wherein the housing and the conical flange are manufactured from stainless steel.

6. The temperature sensor according to claim 1, wherein a contour of the conical flange corresponds to a standard conical flange.

7. A method for producing a temperature sensor according to claim 1, wherein the conical flange is produced in a deep drawn process.

* * * * *